United States Patent Office 3,010,924
Patented Nov. 28, 1961

3,010,924
AIR-DRYING ANTI-CORROSION PAINTS FOR METAL PROTECTION
Carol K. Ikeda, Wallingford, Pa., assignor to E. I. du Pont de Nemours and Company, Wilmington, Del., a corporation of Delaware
No Drawing. Filed June 9, 1958, Ser. No. 740,571
24 Claims. (Cl. 260—23)

This invention relates to organic coating compositions and more particularly to metal protective paint compositions of the type designed for protecting and maintaining structural metals, particularly structural iron and steel.

The use of red lead in oil, that is in drying oils such as linseed oil, and other drying oil paint vehicles pigmented with other corrosion inhibitive metal oxide paint pigments is well known in the art of metal protection painting and maintenance. Although these drying oil paints are well recognized for their performance as primers in providing anti-corrosion protection of steel, iron and other metals, these paints ordinarily are characterized by certain limitations which, although tolerable, are undesirable. A few of these limitations are: (1) The paint is slow drying at practical coating thickness, such as about 2 to 5 mils, a drying time of 48 to 72 hours prior to recoating being ordinary. (2) Single coats at a coating thickness significantly greater than 5 mils ordinarily do not dry or cure adequately. Hence it is necessary to apply two or a plurality of coats with sufficient drying time between coats to provide thick protective paint films. (3) Topcoats applied over these anti-corrosion paint compositions as primers must be judiciously selected to avoid lifting of the primer. Vinyl coating compositions and other polymeric or resinous coatings which are formulated necessarily with high solvency polar solvents ordinarily cannot be applied over such drying oil primers. (4) Drying oil paints ordinarily are necessarily formulated with non-volatile content no greater than about 70% by weight, that is, the volatile diluent is at least 30% by weight of the wet paint composition. On a volume basis, the relative proportion of non-volatile content is even less and, thus, it is readily recognized that a substantial volume of the spread wet paint is a volatile loss.

It is the primary object of this invention to provide new and improved metal protection paint compositions characterized by properties representing improvement in reference to one or more of the aforementioned limitations.

A particularly important object of this invention is to provide anti-corrosion paint compositions for metal protection characterized by significantly enhanced drying or curing rate. Another important object is to provide metal protective paint compositions which can be applied satisfactorily in a thick single coat which provides a significantly greater dried or cured coating weight in comparison with ordinary protective paints. Still another important object is to provide metal protective paint primer compositions which can be coated with dissimilar topcoat compositions formulated with high-solvency volatile polar solvents which ordinarily cause paint lifting.

A further object is to provide protectively coated metal articles having novel combinations of anti-corrosion finishes thereon.

These and other important objects are accomplished by preparing an anti-corrosion metal protection paint composition by dispersing a pigment composition comprising essentially at least one corrosion-inhibitive inorganic pigment in an organic film-forming paint vehicle comprising at least one liquid compound having a plurality of radicals of the following general chemical structure

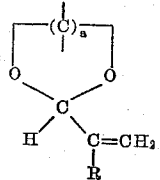

in which the moiety

represents a plurality of carbon atoms in the acetal ring, "a" being an integer having a value of at least 2, all but one of the indicated unsatisfied 2a valences of this moiety being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl, and fluoroaryl when "a" is 2, and consisting additionally of fluoro, chloro, acylamido, and phenylsulfonyl when "a" is greater than 2, and R— is a monovalent radical of the class consisting of hydrogen, alkyl, alkenyl, chloro, fluoro, bromo, cyano, acyloxy, alkoxy, aryloxy or carbalkoxy, the unsatisfied valence of one of the carbon atoms represented by

being the valence through which the cyclic acetal radical is connected to the remainder of the compound, including in the paint composition a catalyst comprising at least one siccative metal drier in an effective air-curing proportion, applying at least one coat of this paint composition to a corrodible metal substrate and allowing the coating to dry in an oxygen-containing atmosphere. The coating can be applied as the entire protective finish or as one or more component coats of a combination protective finish, i.e. as a primer, as an intermediate sandwich coat, or as a topcoat in combination with other protective coatings.

The new liquid compounds per se having a plurality of the above identified cyclic acetal radical which are useful in practicing this invention are more fully disclosed and claimed in my copending United States applications Serial No. 683,021, filed September 10, 1957; Serial No. 730,070, filed April 22, 1958, now abandoned; Serial No. 737,506, filed May 26, 1958; and Serial No. 737,507, filed May 26, 1958.

The characteristic common to all of these new compounds is the presence of a plurality of the radicals for which the structural formula is shown above. This radical is referred to herein for the sake of brevity as the 2-vinyl-1,3-cyclic acetal radical, or simply the vinyl cyclic acetal radical, it being understood that a substituent other than hydrogen can be attached to the alpha carbon atom of the vinyl radical as indicated, that the carbon atoms in the ring can vary in number as indicated and can have substituents as indicated.

For reasons of economy, ease of operation and availability of suitable starting materials, the preferred number of 2-vinyl-1,3-cyclic acetal radicals in a given compound is 2 to 4, although higher numbers can be made. For example, six of such radicals can be attached to a hexavalent radical derived from mellitic acid. Obviously mixtures of compounds can yield compositions in which the over-all average number of vinyl cyclic acetal radicals per molecule is not a whole number.

From the standpoint of rapid air-drying or insolubilization in the presence of oxygen, the preferred new compounds are those in which the vinyl cyclic acetal equivalent does not exceed about 500; in other words, the weight of compound required to provide one gram mole of cyclic acetal radical does not exceed about 500 grams.

The polyvalent connecting radical which joins the plurality of the vinyl cyclic acetal radical is not critical. However it will be obvious to persons skilled in the polymerization art that substituents known to have an inhibiting effect on vinyl polymerization should be avoided or placed in a shielded or sterically hindered position so that the inhibiting effect is minimized. Likewise strongly acidic radicals which tend to open the cyclic acetal ring, and radicals which form insoluble complexes with metallic driers, are preferably avoided. Such obvious precautions yield compounds which offer the maximum advantages of this invention.

Any of the vinyl cyclic acetal compounds embraced by my copending applications are operative in practicing this invention. Ester and ether compounds having a plurality of 2-vinyl-1,3-cyclic acetal alkoxy radicals derived from the 2-vinyl-1,3-cyclic acetal-alkanols represent preferred classes of compounds because of ease of preparation and availability of the starting materials.

Specific examples of useful esters having a plurality of the vinyl cyclic acetal radical are:

(1) Diesters of 2-vinyl-1,3-dioxolane-4-butanol, 2-vinyl-1,3-dioxolane-4-methanol, 2-vinyl-5-methyl-5-methylol-1,3-dioxane respectively and dicarboxylic acids such as orthophthalic, isophthalic, terephthalic; di-, tetra- and hexahydro derivatives of these benzenedicarboxylic acids, malonic, succinic, glutaric, adipic, pimelic, suberic, azelaic, sebacic, dimerized vegetable oil acids (predominantly dimers and trimers of unsaturated $C_{18}$ fatty acids), maleic, fumaric, acetylene dicarboxylic, itaconic, cyclopentanedicarboxylic, cyclopropanedicarboxylic, camphoric, naphthalene dicarboxylic, hydrogenated naphthalene dicarboxylic acids, dicyclopentadiene dicarboxylic, 3,6-endomethylenetetrahydrophthalic, chlorendic acid, diglycolic, triodipropionic, cyclohexenedicarboxylic, acetonedicarboxylic, acetamidomalonic, azodicarboxylic, citraconic and cyclobutanedicarboxylic.

(2) Triesters of the aforementioned alkanols and tricarboxylic acids: tricarballylic, aconitic, 1,2,3-cyclopropanetricarboxylic, citric, and hemi-mellitic.

(3) Tetraesters of the aforementioned alkanols and tetracarboxylic acids; pyromellitic and naphthalenetetracarboxylic.

(4) Pentaesters of the aforementioned alkanols and benzenepentacarboxylic acid.

(5) Hexaesters of the aforementioned alkanols and mellitic acid.

(6) Esters of maleic-modified rosin acids and maleic-modified tall oil acids and the aforementioned alkanols.

In addition to these esters having a plurality of the vinyl cyclic acetal radical linked to the compound by carboxylate linkages, esters of amphoteric compounds and other compounds which function as acids in esterification reactions in the absence of the carboxylic radical, such as for example, cyanurate esters and the ortho esters of acids of silicon, titanium, zirconium, germanium, tin, aluminum, boron, and phosphorous, are also useful in practicing this invention.

Typical examples of useful ether compounds having a plurality of the vinyl cyclic acetal radical are the diethers of polymethylene glycols, diethers of ethylene glycol, diethylene glycol and higher polyethylene glycols, diethers of polytetramethylene glycols, diethers of dihydroxybenzenes, and diethers of bis-phenols, such as diphenylolpropane and diphenylolmethane, and an alkanol containing the described 2-vinyl-1,3-cyclic acetal radical.

Although the described operative liquid vinyl cyclic acetal compounds per se can be used as the organic film forming paint vehicle, considerably greater latitude in paint formulation is provided by combining these compounds with other classes of organic film-forming materials of well recognized utility in the coating art, such as the glyceride drying oils of natural origin, bodied glyceride drying oils, esters of $C_{16}$–$C_{22}$ unsaturated fatty acids, alkyd resins, polyesters resins, cellulose esters and ethers, vinyl ester resins, acrylic resins, methacrylic resins, polyether resins, hydrocarbon resins, and natural resins.

As indicated, drying oil esters of vegetable origin can be present in the organic film-forming composition. These can be of any of the well known glyceride paint oils such as linseed, soya bean, tall oil, safflower, tung, oiticica, perilla, dehydrated castor, and other oils having a major proportion of glyceride ester mixtures of $C_{16}$ to $C_{22}$ ethylenically unsaturated monocarboxylic acids of which a substantial proportion is diethenoid.

In place of the glyceride drying oil esters, the drying oil acid esters can be present as a long, medium or short oil length alkyd resin of which the non-oil components are ordinary alkyd resin-forming components, such as the dicarboxylic acids of which phthalic acid is representative, and aliphatic diols, triols, or even tetrols as in the case of pentaerythritol. These drying oil modified alkyd resins can be further modified in the form of methacrylated alkyds and styrenated alkyds.

For a practical effect the supplemental materials must be present to the extent of approximately 10% based on the weight of the film-forming paint vehicle. Use of large proportions of these supplemental film-forming materials minimizes some of the advantages of using the liquid cyclic acetal compound. Unless the supplemental film-forming material is a liquid or is soluble in the liquid cyclic acetal compound, it is necessary to include a significant proportion of solvent for this supplemental material. Addition of as little as 10% of the vinyl cyclic acetal compound based on the weight of the film-forming paint vehicle having these ordinary film-forming paint vehicle components present provides practical and significant improvements in the characteristics of these paint products.

It is usually desirable to include in the paint vehicle other liquid unsaturated monomers capable of undergoing addition polymerization. Typical examples of these auxiliary monomers are the acrylic acid and methacrylic acid diesters of saturated aliphatic diols such as ethylene glycol, diethylene glycol, triethylene glycol, tetraethylene glycol, propylene glycol, trimethylene glycol, tetramethylene glycol, and higher polymethylene glycols, dibutyl itaconate, dimethyl itaconate, styrene, alpha-methyl styrene, vinyl toluene, methyl sorbate, butyl sorbate, methylene-bis-(acrylamide), tris-(acryl) cyanurate, ethyl acrylate, butyl methacrylate, glycidyl methacrylate, tri-esters of aliphatic triols and methacrylic acid, acrylic acid, phenyl acrylic acid and other alpha, beta ethylenically-unsaturated monocarboxylic acids. When the auxiliary polymerizable monomer contains a plurality of polymerizable $>C=CH_2$ vinylidene groups, as little as 5% based on the weight of the film-forming vehicle will effectively alter the properties of the paint. When the auxiliary polymerizable monomer contains but a single vinylidene group an amount equal to at least 10% by weight of the film-forming vehicle is necessary to produce a practical effect.

Vinyl cyclic acetal compounds having a single 2-vinyl-1,3-cyclic acetal ring can also be used to advantage in the film-forming paint vehicle in combination with the compounds having a plurality of the 2-vinyl-1,3-cyclic acetal radical. The mono-cyclic acetal compound can be an ether, e.g. 2-vinyl-1,3-dioxolane-4-butyl β-cyanoethyl ether, an ester of a monocarboxylic acid, e.g. 2-vinyl-1,3-dioxolane-4-butyl benzoate, or a mixed ester of a polycarboxylic acid, e.g. methyl 2-vinyl-1,3-dioxolane-4-butyl phthalate.

These cyclic acetal compounds having only one of the described vinyl cyclic acetal radicals can be used to control the flexibility and hardness of the cured paint. A softer and more extensible or flexible paint is produced from mixtures containing a substantial proportion of one or more mono-acetal compounds of this class auxiliary to the liquid compound having a plurality of the vinyl cyclic acetal radical in comparison with paints formulated with a film-forming paint vehicle containing only this latter vinyl cyclic acetal compound. Such vehicle mixtures may usefully contain up to 60 mol percent of the mono-acetal compound and in some instances even more.

The catalyst for the paint composition can comprise essentially any of the siccative metal driers ordinarily used in paint and enamel formulation at effective catalytic proportions sufficient to dry or cure the paint in an oxygen-containing atmosphere at atmospheric temperatures or low baking temperatures. In some instances it may be desirable to add siccative drier metal, in the form of soluble derivatives, in proportions up to 10% by weight based on the weight of the organic film-forming paint vehicle. Ordinarily the optimum content of siccative metal does not exceed 3% on the indicated basis. It will be understood, that it may be unnecessary to add siccative metal driers per se to the paint composition to effect air-drying. Oxide pigments of siccative metals and siccative metal impurities in other pigments may be sufficiently reactive in the paint vehicle for in situ formation of an effective proportion of the siccative metal drier. A concentration of as little as 0.01% of siccative metal based on the weight of the organic film-forming paint vehicle is effective for air-drying or curing at room or atmospheric temperature. Cobaltous salts soluble in the paint vehicle are preferred siccative metal driers. Soluble cobaltous salts of half esters of dicarboxylic acids having at least 4 carbon atoms per molecule are particularly effective catalysts, e.g. the cobaltous salt of butyl acid phthalate.

At baking temperatures or under other conditions of forced drying, the catalyst concentration can be lower. For example, a concentration of cobaltous salt equivalent to 0.0005% to 0.005% cobalt metal based on the weight of the film-forming vehicle is effective at temperatures ranging from about 150° F. to about 400° F. Even less catalyst can be used when the thin paint coating is heated in the range of 400° F. to 500° F.

When the film-forming paint vehicle comprises a mixture of the liquid compound having a plurality of the vinyl cyclic acetal radical and another modifying film-forming material such as the drying oils and drying oil modified alkyd resins, the catalyst composition may advantageously be a mixture of the cobaltous ester salt and one or more other siccative metal driers, such as the naphthenates and octoates of such metals as lead, manganese, iron, nickel, cobalt, calcium, barium, zinc, copper, cerium, etc. in the usual proportions.

Similarly, when the film-forming paint mixture includes auxiliary monomeric modifiers capable of undergoing addition polymerization, organic peroxide polymerization catalysts and other free radical initiating polymerization catalysts ordinarily effective in promoting polymerization of vinyl monomers can also be present in the usual amounts if desired. Ordinarily, these polymerization catalysts can supplement the siccative metal drier in amounts up to 5% by weight based on the weight of the polymerizable vinyl components of the film-forming paint vehicle, as little as 0.1% being effective in the mixture of catalysts.

Pigments used in these anti-corrosion metal protection paints can be any of the ordinary corrosion-inhibitive type well known in the coating art. Included in this classification of pigments are the metal oxide pigments such as red lead, lead oxide, litharge, the various yellow, red, brown and black oxides of iron, chromium oxide, zinc oxide, leaded zinc oxide, manganese dioxide, and red or yellow mercuric oxide. Chrome orange and chrome yellow, which are lead chromate pigments, molybdate orange and zinc chromate can also be used as the inhibitive pigment. Metallic pigments such as aluminum powder, aluminum pastes, lead leaf and zinc dust can also be used as the inhibitive pigment. Many of the metal oxidic pigments are from natural sources, rather than being synthetic, and hence the assay will vary with silicates ordinarily being the extender which is detectable in the pigment ash as $SiO_2$. It is preferred to use inhibitive pigments of high assay, that is at least 75% of the ash being the metal oxide. Silicaceous extenders can be included with the metal oxidic pigment. When the paint is to be used as a primer for metal protection, it is particularly desirable that the pigment composition be practically free from soluble salts, such as sulfates and chlorides, the ions of which usually accelerate corrosion.

These corrosion inhibitive pigments are dispersed in the film-forming paint vehicle in ordinary amounts consistent with formulating practices for anti-corrosion metal protection paints. In the case of primers, the pigment volume concentration usually is about 20% to 60%, preferably 25% to 40%. Pigment volume concentration is the volume percentage representing the volume of the pigment composition in reference to the sum of the pigment volume and respective volumes of the film-forming components of the paint vehicle. The volume of the pigment is the displacement volume when wet with the paint vehicle and not the dry bulking volume. These pigments vary widely in density and therefore the weight proportion of pigment can vary widely in conforming with limitations expressed as a pigment volume concentration. The pigment composition can be present at an effective corrosion-inhibitive proportion as low as 5% by weight of the corrosion-inhibitive pigment based on the weight of the organic film-forming paint vehicle up to a pigment volume concentration of about 60%.

The pigment can be dispersed in the film-forming paint vehicle by any of the ordinary pigment dispersion techniques used in the coating art, such as wall milling, pebble milling, sand grinding, stone milling, roller milling, W & P paste mixing, paddle mixing, and in some instances by simple stirring. When the paint vehicle includes other auxiliary film-forming materials in addition to the essential liquid compound having a plurality of the 2-vinyl-1,3-cyclic acetal radical, such as the drying fatty oil glycerides, esters of drying oil fatty acids, alkyd resins, other film-forming polymers, or monomers having polymerizable unsaturation independent of the vinyl cyclic acetal compound, it is usually advantageous to predisperse or prewet the pigment in these auxiliary film-forming materials and then mix the resulting dispersion with the pertinent liquid component having a plurality of the defined 2-vinyl-1,3-cyclic acetal radical.

Paints of this invention can be formulated as solvent-free, that is, the liquid portion of the paint can consist essentially of only the non-volatile organic film-forming components. However, it is usually desirable to include in the paint composition a small proportion of volatile compatible solvent in order to facilitate pigment wetting, for solubilizing auxiliary components to facilitate their distribution in the liquid paint vehicle, and for control of the consistency of the product. When the auxiliary film-forming modifier is poorly soluble in the liquid 2-vinyl-1,3-cyclic acetal compound, a mutual volatile solvent can be present to enhance the solubility. Ordinarily, the non-volatile film-forming content of the liquid paint vehicle will be at least 90% by weight of preferred formulations. In paint compositions containing a major proportion of film-forming material free from a plurality of the defined 2-vinyl-1,3-cyclic acetal radical and only a minor effective amount of the pertinent liquid 2-vinyl-1,3 cyclic acetal compound, it may be desirable to include up to 30% of at least one volatile solvent in the paint composition.

Even more solvent may be added if necessary to provide spraying consistency.

The paints of this invention can be applied by any of the ordinary techniques of paint application such as by brushing, roller-coating, spraying, dipping, etc. Inasmuch as the paint product is primarily designed for application to metal of construction, brushing, spraying and roller-coating are the prevalent application means. These paint products are applicable as a primer to new uncorroded metals or to corroded or rusted metal without any special pretreatment of the corroded metal except to remove loose scale. However, in painting new metal protected by a temporary anti-corrosion oil coating it will be obvious that such oil should be substantially removed before painting.

The paint products of this invention are particularly useful as a primer applied directly to the metal substrate. They can be satisfactorily applied over precoating any ordinary paint, lacquer or enamel which may be fresh or weathered. They can be used as the entire finish on the metal substrate. They can be used as the primer and topcoated with one or more coats of ordinary organic coating compositions, such as vinyl resin enamels, epoxy resin enamels, methacrylate resin enamels, alkyd resin enamels, paints and varnishes or even baking enamels if the finish is to be desirably baked. Further, the invention paint products can be the intermediate coat sandwiched between two ordinary coatings which are different from the 2-vinyl-1,3-cyclic acetal-based paint.

Paints of this invention cure rapidly by air-drying which is particularly important in the painting of already assembled structural metals. When convenient and desirable, the paint on heat-resistant subtrates can be force-dried by heating at temperatures up to 500° F., but ordinarily heating or baking is unnecessary except in high speed production lines where the painted article is immediately packed.

The following examples are illustrative of the invention. All the indicated proportions are on a weight basis unless designated otherwise.

EXAMPLE 1

| | Percent by wt. |
|---|---|
| VDB orthophthalate diester | 17.3 |
| VDB itaconate diester | 17.3 |
| Litharge | 19.3 |
| Iron oxide | 44.5 |
| Cobaltous butyl phthalate solution | 1.6 |
| | 100.0 |

VDB orthophthalate is the orthophthalic acid diester of 4-(omega hydroxybutyl)-2-vinyl-1,3-dioxolane. For convenience throughout the examples and claims, this butanol having a 2-vinyl-1,3-cyclic acetal ring of 5 members as a substituent is designated as VDB (i.e. 2-vinyl-1,3-dioxolane-4-butanol). Preparation of VDB and the orthophthalate diester thereof was as follows:

*Preparation of 4-(omega hydroxybutyl)-2-vinyl-1,3-dioxolane(VDB)*

A three liter, three-necked flask equipped with a thermometer, a stirrer and a continuous water separator was charged with 670 g. (5 mols) of 1,2,6-hexanetriol, 280 g. (5 mols) of acrolein containing a trace of hydroquinone inhibitor, 375 g. of hexane, 5 g. of oxalic acid, and 5 g. of hydroquinone. The mixture was refluxed (50°–67° C.) with continuous removal of water for 24 hrs. (116 ml. removed). The mixture was freed of hexane and acrolein by heating to 60° C. and gradually reducing the pressure to less than 1 mm. Hg. Vacuum distillation (106°–122° C./1–3 mm. Hg) of 876 g. of residue gave 642 g. of water-white oil and 225 g. of tan resin. The oil was dissolved in 650 g. of benzene, washed once with 300 ml. of 5% sodium hydroxide, once with 320 ml. of 5% sodium chloride and once with 200 ml. of 0.5% sodium bicarbonate. The organic phase was dried over anhydrous magnesium sulfate, filtered and substantially freed of benzene at reduced pressure. After heating 30 min. at 50°–60° C./1 mm., 582 g. of 4-(hydroxybutyl)-2-vinyl-1,3-dioxolane were obtained.

*Preparation of the orthophthalic acid diester-VDB orthophthalate*

A three liter, three-necked flask equipped with a thermometer, a stirrer, a nitrogen inlet and an 18-inch helix-packed column topped with a total reflux head was charged with 194 g. (1 mol) of dimethyl orthophthalate, 413 g. (2.4 mols) of 4-hydroxybutyl-2-vinyl-1,3-dioxolane and 260 g. of toluene. The system was purged with nitrogen, and about 86 g. of toluene were distilled off to dry the reaction mixture and the apparatus. After cooling to about 30° C., 3 g. of sodium methoxide was added, and the mixture was heated to reflux (about 95° C.). Toluene-methanol binary was distilled off during the ensuing 2.5 hours. A total of 125 ml. of distillate were collected. At this point, the charge temperature was 144° C. and the vapor temperature was 109° C. The charge was cooled to room temperature and dissolved in a mixture of 220 g. of benzene and 300 g. of hexane. The resulting solution was washed four times with 200 g. portions of water, and the organic phase was separated and dried over anhydrous magnesium sulfate. After filtering, the mixture was substantially freed of solvent and unreacted 4-(hydroxybutyl)-2-vinyl-1,3-dioxolane (VDB) by successively heating at about 60° C., then at about 150° C., at about 1 mm. Hg, 461 g. of liquid pale yellow phthalic acid diester of 4-(hydroxybutyl)-2-vinyl-1,3-dioxolane were obtained.

The itaconic acid diester of VDB was prepared by ester interchange between this substituted butanol and dimethyl itaconate under the same esterification conditions as described for VDB orthophthalate except using 1% of titanium tetraisopropoxide based on the weight of the VDB alcohol as the interchange catalyst. The product was mixed with 500 milliliters of hexane and 200 milliliters of 5% aqueous solution of NaCl, and centrifuged to separate the organic and aqueous phases. The organic phase was then washed twice with 250 milliliter portions of 5% aqueous NaOH and finally washed once with distilled water. The resulting solution of the product in hexane was dried over anhydrous $MgSO_4$, filtered and distilled under reduced pressure to remove the hexane. The product was a pale yellow oil which included a small proportion of methyl ester in addition to preponderant proportion of the VDB itaconate diester.

The solution of cobaltous butyl phthalate contained an amount of this ester salt equivalent to 10 milligrams of cobalt metal per milliliter of acetone solution. This same solution was used in all examples.

In the preparation of this paint and the paint products of the following additional examples, except where the pigment is solely a metallic powder or flake, the pigment compositions were dispersed in the liquid paint vehicles comprising the respective liquid 2-vinyl-1,3-cyclic acetal compounds in an ordinary paint mill.

This paint product of Example 1 applied to clean steel panels in single coats of about 3 mils and 5 mils thickness respectively dried tack-free at room temperature of about 77° F. and relative humidity of about 50% in about 5 hours. Similar panels coated immediately with several coats at increasing thicknesses of 5 mils per coat up to a total thickness of about 30 mils dried tack-free in less than 8 hours.

In comparison, an ordinary red lead in linseed oil primer and an ordinary iron oxide/zinc oxide pigmented linseed oil modified alkyd resin primer each applied at 3 mils thickness to steel panels required a drying period of three days before the primer could be satisfactory topcoated. When these ordinary primers were applied at 5 mils thickness, the coatings were skin-dried in 3 days but insufficiently dried for topcoating. On further drying these coatings wrinkled badly. The 5 mil paint film of the product of Example 1 dried without wrinkling. Even thicker paint films of this product showed wrinkle-free through cure in a drying period significantly shorter than that required to dry 3 mils of the ordinary comparative primers.

This paint product of Example 1 was applied at 3 and 5 mils thickness respectively to structural steel rusted by exposure to an industrial atmosphere. Prior to painting, the loose corrosion scale was removed by mild wire-brushing. The paint wet the corroded surface and penetrated the corrosion residue in a manner comparable with the wetting characteristics of linseed oil paints as exhibited by the aforementioned comparative linseed oil primer and alkyd resin primer applied at the usual thickness.

In protective painting of structural steel, two separate coats of primer and a topcoat ordinarily are applied to provide a protective finish of about 5 mils, total thickness, several days of drying being required between coats. A single 5 mil coat of the dried product of Example 1 provides an equally effective protective finish.

Usually, the topcoat applied over the described ordinary metal primers is significantly different in composition from that of the primer. Prevalent among the topcoat paints are the vinyl resin paints and other resin or polymer based paints which are necessarily formulated with active volatile organic solvents, such as the ketone solvents, ester solvents, and high solvency hydrocarbons. A 0.5 to 1 mil coating of an ordinary plasticized vinyl chloride/vinyl acetate copolymer topcoat paint composition, containing ketone solvents, aromatic hydrocarbons and high solvency naphthas as the volatile solvent composition, applied over the product of Example 1, as a primer at 3 to 5 mils thickness which was air-dried for 5 hours, did not cause this undercoat to wrinkle or lift. In contrast, this vinyl coating composition applied over the comparative red lead in oil primer and the alkyd resin primer, these primers being at about 2 mils thickness respectively and air-dried for three days, caused the undercoat finish to soften, lift and wrinkle. These ordinary primers even after air-drying for one month could not be satisfactorily overcoated with the vinyl paint compositions. The active polar solvents of the topcoat vinyl paint are recognized paint remover components.

Other coating compositions which were satisfactorily applied over the air-dried product of Example 1 as the primer include drying oil paints, alkyd resin paints, phenolic resin paints, chlorinated rubber paints, catalyzed epoxy polyether resin paints, cellulose ester lacquers, nitrocellulose lacquers, polyvinylacetate emulsion paints, rubber latex paints, and synthetic hydrocarbon copolymer latex paints, and acrylic copolymer aqueous dispersion paints, applied at film thicknesses ranging from 0.5 to 10 mils.

The paint product of Example 1 was applied as a single coat of 3–5 mils thickness as a topcoat over structural steel precoated in one instance with red lead in oil and in another with drying oil modified alkyd resin red iron oxide primer, each primer being applied at about 2 mils dry thickness and dried 72 hours prior to topcoating. Adhesion of the topcoat was satisfactory and did not cause lifting of the respective primers.

In another test finishing system, the steel was primed as indicated above with the ordinary comparative primers applied at about 2 mils and dried for 72 hours prior to overcoating, 2 mils of the paint product of Example 1 was applied thereover and dried overnight, and then topcoated with about 1 mil of the ordinary plasticized vinyl chloride/vinyl acetate copolymer paint. There was no lifting or wrinkling of the 3 coat system having the invention paint as the intermediate coat. Adhesion between the respective primers and the intermediate coat and between the topcoat and the intermediate coat was good.

The durability and the anti-corrosion effectiveness of this paint of Example 1 was at least equal to that of ordinary comparative linseed oil paint and linseed oil modified alkyd resin paint based on accelerated weathering tests and practical weathering tests in industrial atmospheres both in northern and southern climates.

EXAMPLE 2

| | Percent by wt. |
|---|---|
| VDB orthophthalate diester | 37.4 |
| Zinc oxide | 12.9 |
| Iron oxide | 48.0 |
| Cobaltous butyl phthalate solution | 1.7 |
| | 100.0 |

EXAMPLE 3

| | |
|---|---|
| VDB orthophthalate diester | 11.9 |
| Raw linseed oil | 9.7 |
| Red lead oxide | 76.7 |
| Cobaltous butyl phthalate—acetone solution | 0.5 |
| Lead naphthenate solution—16% Pb in mineral spirits | 0.14 |
| Manganese naphthenate solution—6% Mn in mineral spirits | 0.08 |
| Mineral spirits | 0.98 |
| | 100.00 |

EXAMPLE 4

| | |
|---|---|
| VDB orthophthalate diester | 3.0 |
| Ethylene glycol bis ester of methacrylic acid | 9.0 |
| Raw linseed oil | 9.0 |
| Red lead oxide pigment | 78.3 |
| Catalyst: | |
|     Cobalt naphthenate drier solution | 0.4 |
|     Cobaltous butyl phthalate solution | 0.3 |
| | 100.0 |

The catalyst added to this composition consisted of a mixture of cobalt naphthenate solution in mineral spirits in an amount of 10 milligrams of cobalt metal per milliliter of the drier solution and the aforementioned in acetone.

Substitution of a long oil length (64%) linseed oil modified glyceryl phthalate alkyd resin for the linseed oil in this formulation provided an equivalent product.

EXAMPLE 5

| | Percent by wt. |
|---|---|
| VDB itaconate diester | 12.0 |
| Linseed oil modified alkyd resin, 83% non-volatile in high solvency petroleum naphtha | 10.0 |
| Raw linseed oil | 12.0 |
| Zinc oxide pigment | 6.8 |
| Iron oxide pigment | 51.6 |
| Cobaltous butyl phthalate solution | 1.0 |
| Manganese naphthenate solution, 6% Mn in mineral spirits | 0.2 |
| Lead naphthenate solution, 16% Pb in mineral spirits | 1.0 |
| Cresol solution 10% in mineral spirits | 0.4 |
| Mineral spirits | 5.0 |
| | 100.0 |

The alkyd resin was a 64% oil length glyceryl phthalate resin having an acid number of about 4 and containing unesterified hydroxyls equivalent to 1.7% of glycerol.

EXAMPLE 6

| | Percent by wt. |
|---|---|
| VDB orthophthalate diester | 43.2 |
| Zinc chromate pigment | 54.8 |
| Cobaltous butyl phthalate solution | 2.0 |
| | 100.0 |

EXAMPLE 7

| | |
|---|---|
| VDB-isophthalate diester | 20.0 |
| Red lead pigment | 80.0 |
| | 100.0 |

The VDB isophthalate diester was prepared by following identically the procedure described for VDB orthophthalate diester substituting dimethyl isophthalate for the dimethyl orthophthalate.

Self-catalyzed, a 4 mil coating of this paint was tack-free in 40 hours. Ordinary red lead in linseed oil primer formulated without added siccative metal driers fails to dry satisfactorily and tack-free at the usual coating thickness of about 2 mils during a drying period of one month. When 100 grams of this paint composition of Example 7 was catalyzed by addition of 0.4 ml. of cobalt naphthenate solution in toluol at 25 milligrams of cobalt per ml. of the catalyst solution, a 4 mil coating of this paint was tack-free after drying overnight.

EXAMPLE 8

| | Percent by wt. |
|---|---|
| VDB/PA-polyester solution—80% in xylol | 4.2 |
| VDB cyanoethyl ether | 15.2 |
| VDB itaconate diester | 15.2 |
| Litharge | 19.3 |
| Iron oxide pigment | 44.4 |
| Cobaltous butyl phthalate solution | 1.7 |
| | 100.0 |

The VDB/PA polyester is the esterification product of 1 mol (148 grams) of phthalic anhydride and 1.6 mols (275 grams) of the VDB alcohol prepared by heating these reactants under nitrogen for 2 hours at 200° C., followed by heating at 225° C. for four hours and then blown with nitrogen at 225° C. for 30 minutes. 370 grams of polyester product were recovered having an acid number of 6.9, an ester equivalent weight of 185 and a hydroxyl equivalent weight of 435. This polyester was diluted to 80% concentration with xylol.

The VDB cyanoethyl ether is the monoether product of 1 mol (172 grams) of the VDB alcohol reacted with 1 mol (53 grams) of acrylonitrile in the presence of 1 gram of 35% solution of trimethylbenzylammonium hydroxide (Triton B) in methanol as the catalyst. In preparing this ether product, the VDB alcohol and the catalyst were mixed and the acrylonitrile was gradually added thereto over a one hour period with agitation. The mixture was stirred for an additional hour and then neutralized with acetic acid. The reaction mixture was distilled under reduced pressure using a short Vigreaux column collecting the fraction boiling from 113° C. to 124° C. at .2 to .4 mm. of Hg. The weight of this fraction was 178 grams having a refractive index of 1.4606 at 25° C. The viscosity was A-3 or about .14 poise. Nitrogen analysis indicated this product to be the beta cyanoethyl ether of the VDB alcohol.

The VDB/PA polyester is an advantageous component of the paint to facilitate pigment wetting during the pigment dispersion operation.

The VDB cyanoethyl ether advantageously lowers the viscosity of the paint product and significantly enhances wetting of the corrosion residue by the paint when applied to rusted steel or other corroded metals.

Coatings of this paint product up to 10 mils thickness dried tack-free overnight. Coatings of 3 to 5 mils thickness dried satisfactorily in 8 to 12 hours for recoating.

EXAMPLE 9

| | Percent by wt. |
|---|---|
| VDB/PA-polyester solution—80% in xylol | 4.2 |
| 2-(2'-vinyl-1',3'-dioxolane-4'-butoxy)pyran | 7.6 |
| Tris-VDB-cyanurate | 22.8 |
| Litharge | 19.3 |
| Iron oxide pigment | 44.4 |
| Cobaltous butyl phthalate solution | 1.7 |
| | 100.0 |

The substituted pyran was prepared by reacting 84 parts by weight of 2,3-dihydropyran with 172 parts of VDB alcohol in the presence of 1 part of oxalic acid and fractionating to recover the substituted pyran.

The tris-VDB-cyanurate was prepared by alcoholysis of 249 parts by weight of triallyl cyanurate and 516 parts of the VDB alcohol in the presence of 400 parts of toluol and 5 parts of sodium methoxide. The reaction product mixture was refined to recover the tris-VDB cyanurate.

The performance of this product is comparable to the product of Example 8 except for slightly slower drying. A 5 mil coating dried tack-free overnight.

EXAMPLE 10

| | Percent by wt. |
|---|---|
| VDB/PA polyester solution—80% in xylol | 4.2 |
| 2-(2'-vinyl-1',3'-dioxolane-4'-butoxy)pyran | 15.2 |
| VDB itaconate diester | 15.2 |
| Litharge | 19.3 |
| Iron oxide pigment | 44.4 |
| Cobaltous butyl phthalate solution | 1.7 |
| | 100.0 |

The drying and the performance of this paint product is equivalent to that of the product of Example 8.

EXAMPLE 11

| | Percent by wt. |
|---|---|
| VDB/PA-polyester solution—80% in xylol | 4.2 |
| VDB-benzoate | 15.2 |
| Tris-VDB-cyanurate | 15.2 |
| Litharge | 19.3 |
| Iron oxide pigment | 44.4 |
| Cobaltous butyl phthalate solution | 1.7 |
| | 100.0 |

The VDB benzoate is the monofunctional vinyl cyclic acetal monoester resulting from the esterification of the VDB alcohol with benzoic acid.

The drying and performance of this paint product is comparable with that of the product of Example 9.

EXAMPLE 12

| | Percent by wt. |
|---|---|
| Polymerized fatty acid 2-vinyl-1,3-dioxolane ester compound | 34.6 |
| Litharge pigment | 19.3 |
| Iron oxide pigment | 44.5 |
| Cobaltous butyl phthalate solution | 1.6 |
| | 100.0 |

The indicated polymerized fatty ester compound is essentially a mixture of diesters and triesters resulting from full esterification of "Empol" 1022 polymerized fatty acid with 2-vinyl-1,3-dioxolane-4-methanol. This alkanol is conveniently identified as VDM. The composition of this polymerized fatty acid is essentially dimers and trimers of natural occurring unsaturated $C_{18}$ monocarboxylic acids, largely linseed oil acids having a $C_{36}$ dimer content of about 75%, a $C_{54}$ trimer content of about 22% to 24% and a $C_{18}$ monomer content up to about 3%. The neutralization equivalent weight is about 289 to 304.

These paint products of Examples 2 to 12 inclusive were evaluated in the same manner as the paint product of Example 1. At a coating thickness of 3 to 5 mils, the respective paints cured overnight for satisfactory topcoating. The paint products of Examples 4, 5, 8 and 10 cured overnight even at 10 mils thickness. The respective rates of dry or cure of these compositions are not as rapid as that of Example 1, but are significantly fast in comparison with ordinary drying oil and alkyd resin paints. Like the paint product of Example 1, they are satisfactory as primers directly on the metal substrate, new, corroded, or having a weathered prior organic finish thereon. They are satisfactory as an intermediate coat sandwiched between a different undercoat and different topcoat and they are satisfactory as a topcoat self-primed or over a different undercoat.

In addition to use on clean steel, on steel having mill scale, and on rusted steel, the paint product of Example 6 is satisfactory as a primer for aluminum and aluminum alloys and can be used wherever ordinary zinc chromate primers are specified.

EXAMPLE 13

|  | Percent by wt. |
|---|---|
| Sebacic acid diester of 2-vinyl-5-methyl-5-methylol-1,3-dioxane | 25.0 |
| VDB itaconate diester | 10.0 |
| Litharge | 19.2 |
| Iron oxide | 44.2 |
| Cobaltous butyl phthalate solution | 1.6 |
|  | 100.0 |

The indicated sebacic acid diester was prepared by ester interchange between dimethyl sebacate and 2-vinyl-5-methyl-5-methylol-1,3-dioxane, this latter alkanol being the condensation product of acrolein and trimethylolethane.

The drying and performance of this paint is comparable with that of the product of Example 1. A 5 mil coating cured in 5 to 6 hours at ordinary room temperature and humidity.

EXAMPLE 14

|  | Percent by wt. |
|---|---|
| VDB phthalate diester | 10.0 |
| Zinc dust pigment | 89.5 |
| Cobaltous butyl phthalate solution | .5 |
|  | 100.0 |

In preparing this paint primer, the pigment was merely stirred into the mixture of the diester and the cobaltous salt catalyst. This paint primer was evaluated as a primer for galvanized iron as well as for new steel and rusted steel. A 5 mil coating cured overnight and except for the much faster drying rate, the performance was comparable with an ordinary zinc dust primer having a drying oil modified alkyd resin vehicle.

EXAMPLE 15

|  | Percent by wt. |
|---|---|
| VDB mixed with phthalate/itaconite diester | 34.6 |
| Litharge | 19.3 |
| Iron oxide | 44.5 |
| Cobaltous butyl phthalate solution | 1.6 |
|  | 100.0 |

The VDB mixed phthalate/itaconate diester is the ester-interchange product of 1.8 mols VDB, 1 mol of dimethyl phthalate, 1 mol of dimethyl itaconate and 1 mol of pentanediol-1,5. This diester product was prepared following the same general procedure described above for the preparation of the itaconate diester using 1% of titanium tetraisopropoxide, based on the total weight of the VDB and the diol, as the interchange catalyst.

The drying and performance of this paint product is comparable with that of the product of Example 1. A 5 mil coating cured in 5 hours and thicker films up to 30 mils cured in less than 8 hours. Single coats significantly greater than 5 to 10 mils usually are subject to wrinkling.

VDM, the alkanol 2-vinyl-1,3-dioxolane-4-methanol, substituted wholly or in part on a molar basis for the VDB in the preparation of the mixed diester specified in Example 15 and the resulting mixed diester used as described in this example provides a paint product characterized by comparable performance and drying rate.

While there are described above only a limited number of preferred embodiments of the products and processes of the invention, it is readily possible to produce still other novel widely-variant embodiments without departing from the disclosed concept of the invention and it is desired therefore that only such limitations be imposed on the appended claims as are stated therein or are required by the prior art.

I claim:
1. An air-curable anti-corrosion metal protective paint composition comprising a pigment composition comprising essentially at least one corrosion-inhibitive inorganic pigment, a catalyst comprising at least one siccative metal drier in an effective proportion sufficient for air-curing the paint, and an organic film-forming paint vehicle comprising at least one liquid compound containing two to six, inclusive, cyclic radicals of the following general chemical structure.

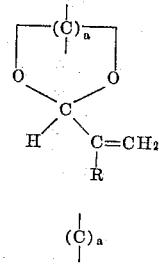

where $$(\overset{|}{\underset{|}{C}})_a$$

represents carbon atoms in the acetal ring, "a" being an integer having a value of 2 to 3, all but one of the indicated unsatisfied 2a valences of said ring carbon atoms being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when "a" is 2, and consisting additionally of fluoro, chloro, acylamido and phenylsulfonyl when "a" is 3, the one remaining valence being that which connects the cyclic radical to at least one additional such cyclic radical through an interposed linking polyvalent radical, and R— is a monovalent radical of the class consisting of hydrogen, alkyl, alkenyl, chloro, fluoro, bromo, cyano, acyloxy, chloroalkyl, fluoroalkyl, cyanoalkyl, alkoxy, aryloxy and carbalkoxy.

2. The paint product of claim 1 wherein said vinyl cyclic acetal compound contains ether oxygen in said linking polyvalent radical.

3. The paint product of claim 1 wherein said vinyl cyclic acetal compound contains at least one carboxylic ester function in said linking polyvalent radical.

4. The paint product of claim 3 wherein said vinyl cyclic acetal compound diester of a dicarboxylic acid and a hydroxyl-substituted compound containing one said vinyl cyclic acetal radical per molecule.

5. The paint product of claim 4 wherein said dicarboxylic acid is a benzenedicarboxylic acid.

6. The paint product of claim 4 wherein said dicarboxylic acid is an aliphatic dicarboxylic acid.

7. The paint product of claim 4 wherein said dicarboxylic acid is an unsaturated dicarboxylic acid containing an alpha methylene group.

8. The paint product of claim 7 wherein said unsaturated acid is itaconic acid.

9. The paint product of claim 3 wherein said ester is the mixed ester product of an ester interchange reaction between 1 mol of dimethyl orthophthalate, 1 mol of dimethyl itaconate, 1 mol of a saturated aliphatic diol having two primary hydroxyl substituents and an amount of a 2-vinyl 1,3-dioxolane-4-alkanol substantially equivalent to 2 mols of hydroxyl substituent.

10. The paint product of claim 1 wherein said film-forming paint vehicle comprises a mixture of the diesters of itaconic acid and a benzenedicarboxylic acid and a 2-vinyl-1,3-dioxolane-4-alkanol.

11. The paint product of claim 1 wherein said film-forming paint vehicle comprises a mixture of at least one said liquid compound having a plurality of said vinyl cyclic acetal radical and a polymerizable unsaturated monomer which is a diester of a saturated aliphatic diol having two primary hydroxyl substituents and an unsaturated monocarboxylic acid having a $>C=CH_2$ vinylidene moiety.

12. The paint product of claim 1 wherein said corrosion-inhibitive pigment composition is present in an amount from 5% by weight based on the weight of the film-forming vehicle to about 60% pigment volume concentration.

13. The paint product of claim 12 wherein said pigment composition essentially comprises at least one metal oxide pigment.

14. The paint product of claim 13 wherein said pigment composition essentially comprises a mixture of a major proportion of iron oxide pigment and a minor proportion of zinc oxide pigment.

15. The paint product of claim 13 wherein said pigment composition essentially comprises a mixture of iron oxide pigment in major proportion and litharge in minor proportion.

16. The paint product of claim 12 wherein said pigment composition consists essentially of a finely divided metal pigment.

17. The paint product of claim 1 wherein said catalyst comprises a cobaltous organic salt present in an amount equivalent to 0.01% to 0.3% of cobalt metal based on the weight of said film-forming vehicle.

18. An air-curable paint primer composition comprising an organic film-forming paint vehicle comprising at least one liquid diester of a dicarboxylic acid and 2-vinyl-1,3-dioxolane-4-butanol, a pigment composition essentially comprising zinc chromate, and a catalyst composition comprising an organic cobaltous salt in a small effective proportion sufficient to promote air-drying of the paint up to 0.3% of cobalt metal based on the weight of said film-forming vehicle.

19. An anti-corrosion protected metal article consisting essentially of a corrodible metal substrate and as anticorrosion primer coating thereon, a cured coat of the paint product of claim 1.

20. The article of claim 19 wherein said metal substrate is structural steel.

21. The article of claim 20 wherein said substrate is rusted structural steel.

22. The article of claim 19 further having a different durable, weather-resistant, air-dried organic coating superimposed over said cured primer.

23. An anti-corrosion protected metal article consisting essentially of a corrodible metal substrate having an organic undercoat finish thereon and superimposed thereover at least one cured coat of the paint product of claim 1, the composition of said undercoat being different from the composition of said superimposed coating.

24. The method of protecting corrodible metal which comprises essentially of applying thereto at least one coat of the air-curable paint product of claim 1, exposing the coating to an oxygen-containing atmosphere and allowing said paint to air-cure, sufficient paint being applied to provide a protective cured paint thickness of at least 5 mils.

References Cited in the file of this patent

UNITED STATES PATENTS 2,401,776     Rothrock _____ June 11, 1946

FOREIGN PATENTS 757,573     Great Britain _____ Sept. 19, 1956

OTHER REFERENCES

Mattiello: "Protective and Decorative Coatings," vol. 1 (1954), John Wiley and Sons, London, pp. 30 and 31.

UNITED STATES PATENT OFFICE
CERTIFICATION OF CORRECTION

Patent No. 3,010,924                                    November 28, 1961

Carol K. Ikeda

It is hereby certified that error appears in the above numbered patent requiring correction and that the said Letters Patent should read as corrected below.

Column 6, line 40, for "wall" read -- ball --; column 8, line 72, for "satisfactory" read -- satisfactorily --; column 14, line 45, after "compound" insert -- is a --.

Signed and sealed this 17th day of April 1962.

(SEAL)
Attest:

ESTON G. JOHNSON                                 DAVID L. LADD
Attesting Officer                                     Commissioner of Patents